United States Patent [19]
Joyce et al.

[11] Patent Number: 5,921,530
[45] Date of Patent: *Jul. 13, 1999

[54] POSTS, BATTENS AND ACCESSORIES THEREFOR

[75] Inventors: Kevin P. Joyce; Stuart M. Innes; Rodney M. Innes, all of Auckland, New Zealand

[73] Assignee: Manukau Fifty Limited, New Zealand

[ * ] Notice: This patent issued on a continued prosecution application filed under 37 CFR 1.53(d), and is subject to the twenty year patent term provisions of 35 U.S.C. 154(a)(2).

[21] Appl. No.: 08/628,691
[22] PCT Filed: Oct. 14, 1994
[86] PCT No.: PCT/NZ94/00108
  § 371 Date: May 10, 1996
  § 102(e) Date: May 10, 1996
[87] PCT Pub. No.: WO95/10372
  PCT Pub. Date: Apr. 20, 1995

Related U.S. Application Data

[30] Foreign Application Priority Data
Oct. 15, 1993 [NZ] New Zealand ............................ 248964

[51] Int. Cl.⁶ ..................................................... B21F 27/00
[52] U.S. Cl. ................................. 256/48; 256/47; 256/54; 40/607; 52/720.1
[58] Field of Search ................................ 256/32, 33, 47, 256/48, 53, 54, 56, 57

[56] References Cited

U.S. PATENT DOCUMENTS

| 803,706 | 11/1905 | McMaster ............................ 256/48 X |
| 987,485 | 3/1911 | Peterson .................................... 256/54 |
| 1,057,260 | 3/1913 | Murray ...................................... 256/54 |
| 1,081,845 | 12/1913 | Lehrke ...................................... 256/48 |
| 1,102,394 | 7/1914 | De Ros ..................................... 256/54 |
| 1,136,746 | 4/1915 | White ....................................... 256/48 |
| 1,466,880 | 9/1923 | Hindmarsh et al. . |
| 1,477,349 | 12/1923 | Hindmarsh et al. ....................... 256/47 |
| 2,067,890 | 1/1937 | Collord . |
| 2,998,087 | 8/1961 | Iddings . |
| 3,305,985 | 2/1967 | Dean .................................... 256/47 X |
| 3,959,852 | 6/1976 | Sasena . |
| 3,972,110 | 8/1976 | Sasena ................................ 256/54 X |
| 4,223,872 | 9/1980 | Boal .................................... 256/53 X |
| 4,270,737 | 6/1981 | Binns et al. ............................ 256/48 |
| 4,804,166 | 2/1989 | Makus ................................ 256/54 X |
| 4,867,421 | 9/1989 | Vernon ................................ 256/47 X |
| 5,110,094 | 5/1992 | Kruse ....................................... 256/47 |
| 5,660,377 | 8/1997 | Specht ................................ 256/47 X |
| 5,676,351 | 10/1997 | Speece et al. ........................ 256/47 X |

FOREIGN PATENT DOCUMENTS

| 24604/67 | 11/1969 | Australia . |
| 49213/85 | 10/1985 | Australia . |
| 0 168 294 A2 | 1/1986 | European Pat. Off. . |
| 2452558 A1 | 3/1979 | France . |
| 2467945 | 5/1981 | France ..................................... 256/47 |
| 212487 | 9/1987 | New Zealand . |
| 214830 | 11/1987 | New Zealand . |
| 217784 | 10/1988 | New Zealand . |
| 1404231 | 8/1975 | United Kingdom . |

Primary Examiner—Daniel P. Stodola
Assistant Examiner—Bruce A. Lev
Attorney, Agent, or Firm—Brown, Martin, Haller & McClain, LLP

[57] ABSTRACT

A post for fencing and other purposes is provided with an opening in one face to facilitate locking engagement of a fastener thereto. The face has an open channel with channel sides formed by adjacent inwardly turned edges to which attachments can be made. The channel sides are serrated and cooperate to provide a series of aligned apertures to which attachments can be secured.

5 Claims, 7 Drawing Sheets

POSTS, BATTENS AND ACCESSORIES THEREFOR

TECHNICAL FIELD

This invention relates to posts, battens and the like which have a number of uses, one example being the construction of permanent or semi-permanent fencing.

BACKGROUND ART

New Zealand Patent No.s 212487, 214830 and 217784 describe elements of a fencing system based on a metal post. The fencing system has been sold in New Zealand and elsewhere under the name STAPLELOK™, and has substantial advantages when compared with conventional (timber and metal) post and batten fences.

The STAPLELOK system provides ease of handling, it is fast to erect, versatile and flexible.

In recent times a market has developed for more robust fencing systems for horticultural building and security applications, one of the requirements of this market being that the relative movement of horizontal fence wires in an installation should be minimised, and increased torsional strength is also desirable.

One object of the present invention to provide improvements to metal fencing systems which will increase the versatility and strength of the systems and which will address the above-mentioned needs.

Further objects and advantages of the present invention will become apparent from the ensuing description which is given by way of example.

DISCLOSURE OF INVENTION

According to the present invention there is provided an elongate post having on at least one face an opening to which attachments can be made, said opening providing opposed inwardly turned edges and means to facilitate locking engagement of a fastener member therewith.

The post can be of a substantially rectilinear cross-section.

The inwardly turned edges can be serrated.

The serrated edges can be regular and of a generally saw-tooth configuration with the tips of each coincident.

The inner faces of the inwardly turned edges at the widest point can be provided with a surface which is substantially parallel with the said at least one face.

Posts as aforesaid can be used to support a series of spaced fence wires, the fence wires being secured to the posts by staples driven into the openings of the posts.

The staples can be two-pronged staples each prong being joined by a common limb and each staple engaging with a separate part of the opening of said at least one face.

The locating face of said inner edges can be co-planar with the ridge of the spike of each staple prong.

The post can be secured to a structure to support a wall lining or such like of a building.

According to a further aspect of the present invention there is provided a method of manufacturing a post as aforesaid comprising the steps of feeding an elongate plate to a roll forming apparatus, serrating side edges of the elongate plate and shaping the plate into a box-section.

The side edges can be shaped prior to being serrated.

The serration can be achieved by a pair or pairs of complimentary toothed wheels.

According to yet a further aspect of the present invention there is provided a post driver comprising an elongate post tube, having an open end and a closed end, a pair of spaced cross-bars fixed to the post tube near its open and closed ends, a handle comprising a cap and two hand grips which extend from the cap and which are slidingly supported by a first cross-bar adjacent the closed end of the post tube and fixed to the cross-bar adjacent the open end and resilient compressible members extending between the cap and said first cross-bar, the cap being spaced from the closed end of the post tube a predetermined distance and capable of contact closed end of the post tube when the post tube is impacted on a post.

BRIEF DESCRIPTION OF DRAWINGS

Aspects of the present invention will now be described with reference to the accompanying drawings in which.

BEST MODES FOR CARRYING OUT THE INVENTION

Figure 1:
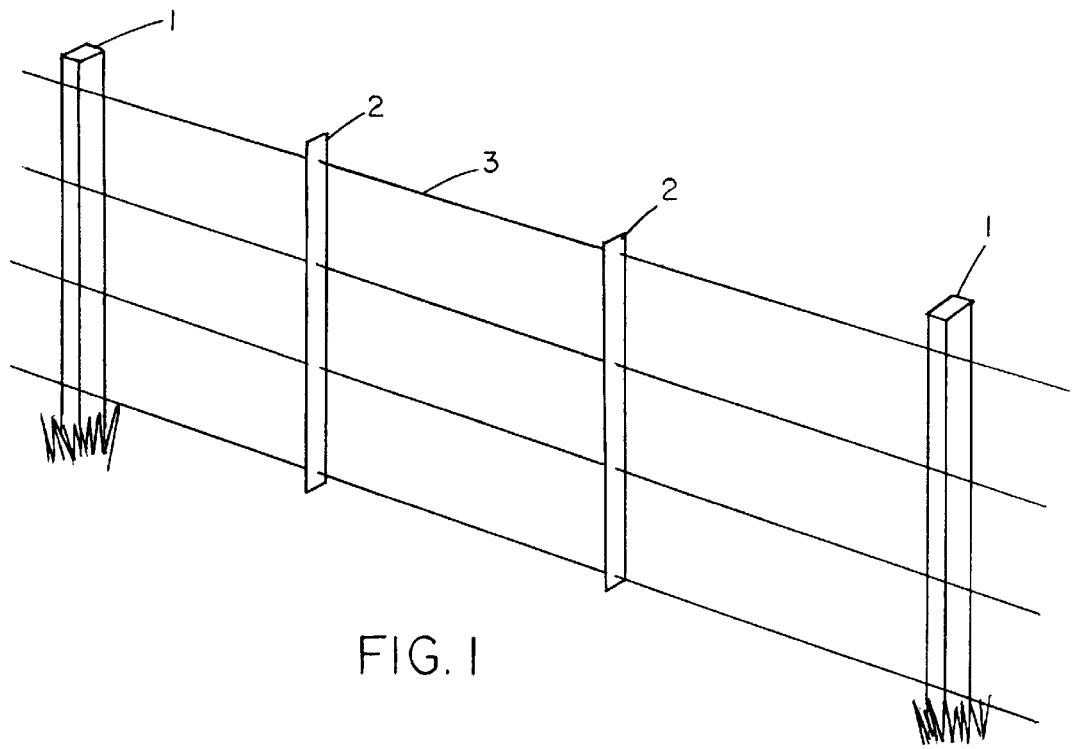
FIG. 1 is a diagram of a horizontal wire fence using battens/posts and attachment means.
Figure 2:
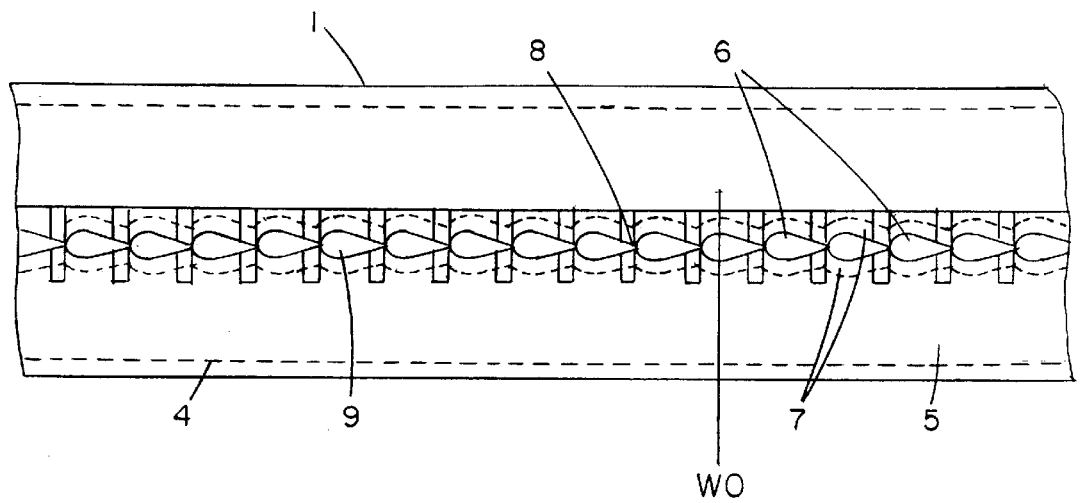
FIG. 2 is a side view on the front face of a post in accordance with the present invention.
Figure 3:
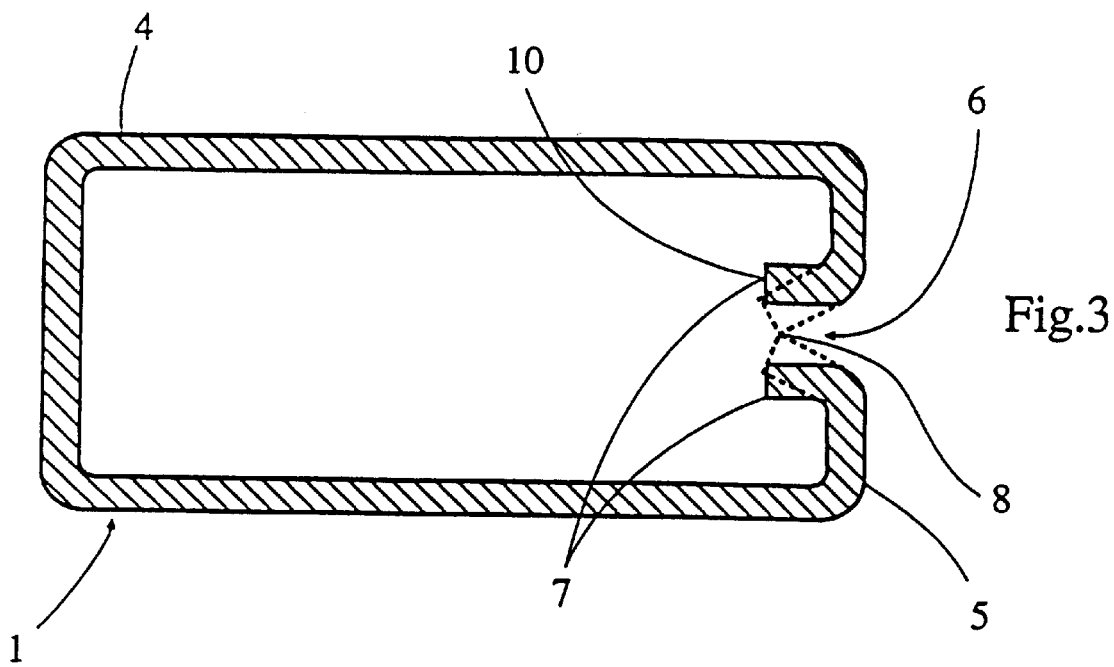
FIG. 3 is an enlarged cross-section of the post of FIG. 2.
Figure 4:
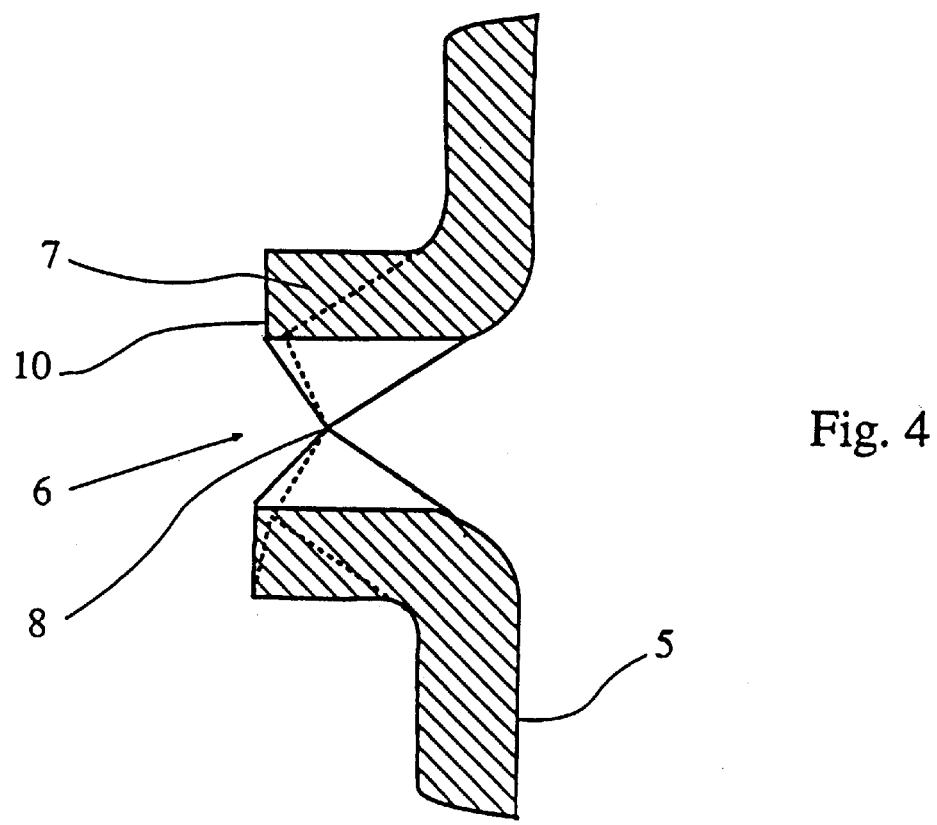
FIG. 4 is an enlarged cross-section at the opening of the post of FIG. 2.
Figure 5:
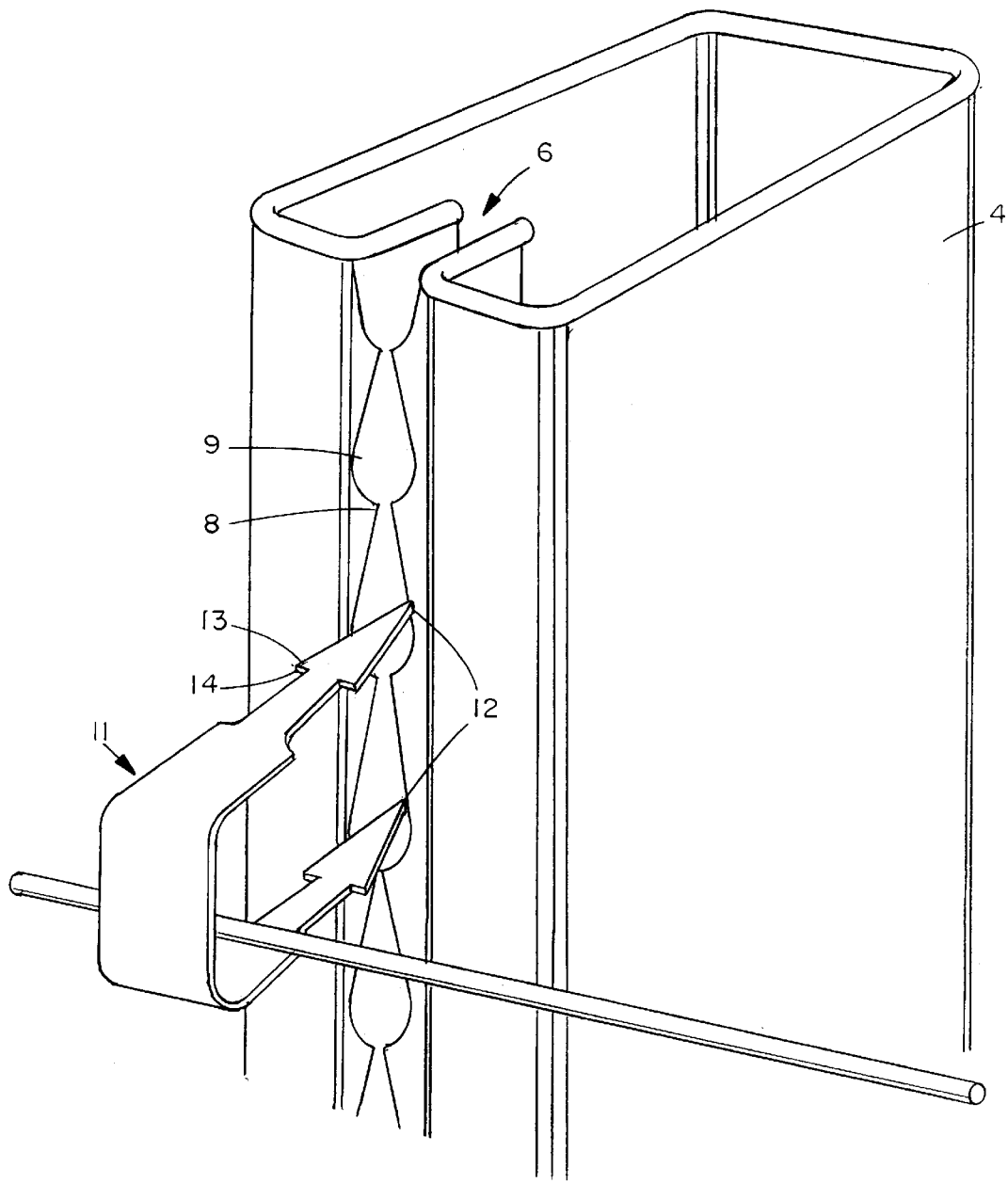
FIGS. 5 is a perspective view of a fastener post and wire in accordance with the present invention.

With respect to the drawings and by way of example a simple horizontal wire fence comprises posts generally indicated by arrow 1, intermediate battens generally indicated by arrow 2, and a plurality of horizontal fence wires 3. The posts 1 are driven into the ground and the battens 2 span the fence wires from top to bottom. The fence is erected by driving the required number of posts 1 into the ground securing wires 3 to the posts using staples or other means, tensioning the wires and then fixing the battens 2 at desired intervals.

With respect to FIGS. 2 to 6 of the drawings a post 1 in accordance with the present invention may have a substantially rectilinear section body 4 having a front face 5 with an opening generally indicated by arrow 6 therein.

Opposite faces of the body 4 may be of complimentary equal or unequal lengths. Each post may be provided with a cap (not shown) which protects the tip of the post against impact.

Preferably the body 4 is constructed in metals as aforesaid although other materials may be suitable.

The opening 6 is defined by two inwardly turned free edges 7 which are serrated such that tips of the free edges meet or nearly meet at 8 at intervals with sockets 9 being provided between. The front face 5 thus presents a series of sockets 9 to which fasteners or other attachment means can be secured.

The New Zealand STAPLELOK™ patents previously referred to describe how a staple can be driven into a channel between flanges of posts to secure wires or other attachments to the posts.

The opening 6 of the post of the present invention also facilitates the attachment of staples and other accessories in a somewhat similar manner with the important exception that the opening 6 is not a channel and the arrangement of the present invention prevents longitudinal movement of the staple (movement in a vertical plane when a fence is erected). It is noted that the inner-most parts 10 of the edges 7 are substantially parallel to the front face of the post, and that the sockets 9 are wider than they are deep.

The staple illustrated (FIGS. 5 and 6) has arms generally indicated by arrow 11 which are generally spear-shaped having a tip part 12, divergent sides 13 which lead to a shoulder 14 where the arm narrows to be a predetermined width W larger than the width WO of the sockets 9 in the front face 5 of the post 1.

The post 1 can be formed by roll forming from a flat sheet of material with rollers gradually making each bend in the body of the post and forming the serrated free edges 7. At the end of the roll forming process the closed edges 7 are near contact at intervals as discussed.

Figure 6:
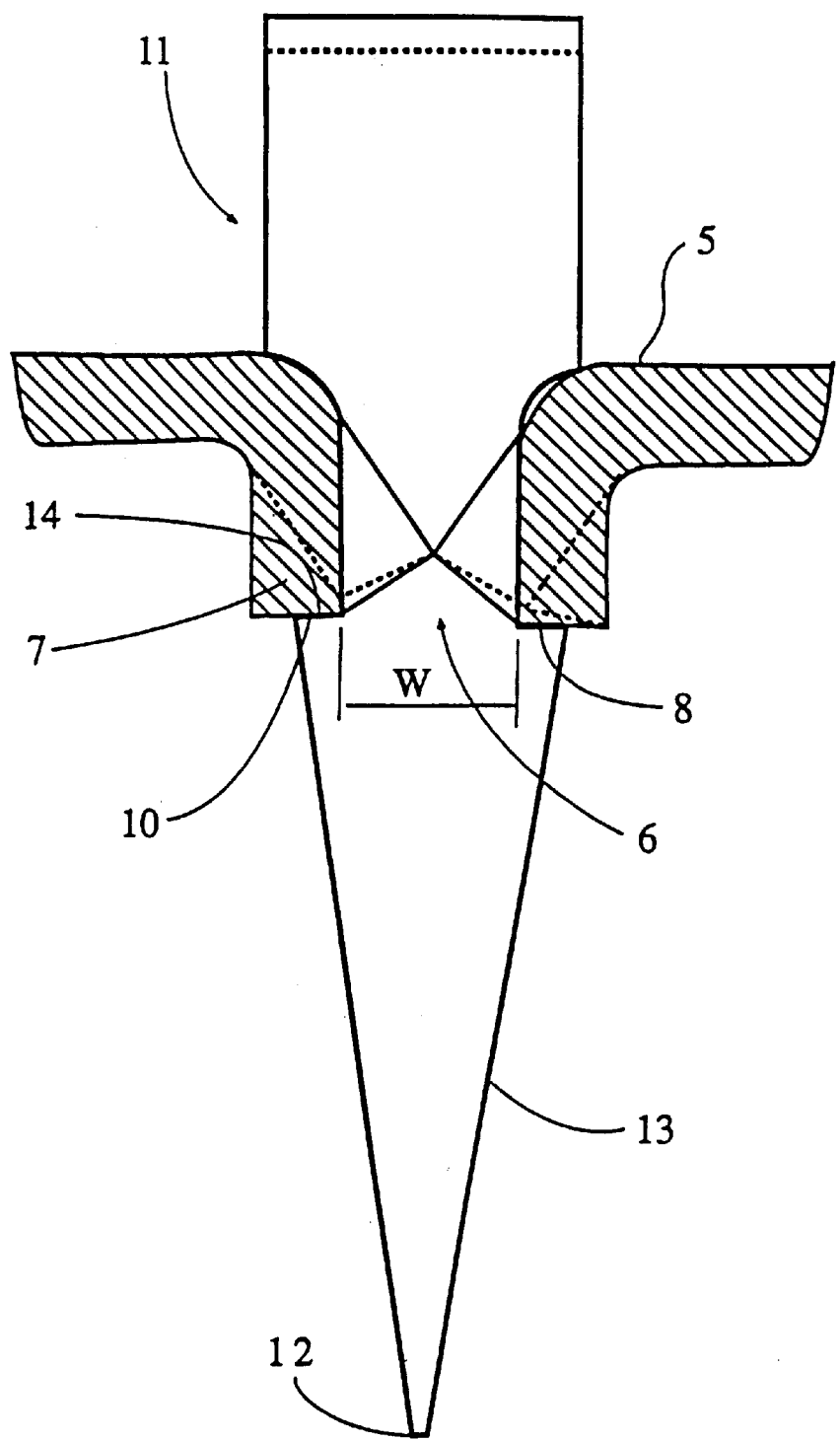
FIG. 6 is an enlarged cross-section at the opening of the post of FIG. 2 showing a fastener fixed thereto.

The resilience of metal allows arms 11 of a staple or other fixture to be driven into the sockets 9 by momentary and localised parting of the free edges, sufficient to allow the widest part of the shoulder 14 to pass through the sockets 9 whereupon shoulders 14 locate in face-to-face engagement with the innermost parts or end faces 10 on the post 1 as illustrated in FIG 6. In the absence of a forced re-opening of the opening, the matching of the shoulder and end face 10 edge secures the arms 11 against withdrawal. As discussed, the opposing tips 8 of the serrations form closed ends to the sockets 9 which prevent the arms 11 sliding on the post. Any twisting of arms 11 also locks the arms further securing against withdrawal.

The post described is considered to have the significant advantages of being more robust than its predecessors and whilst maintaining all of the previous advantages, the serrated face allows staples and attachments to be securely fixed and the post configuration provides to torsional and other bending forces which may be imposed on it.

Mentioned earlier was the fact that the posts described may be useful in other applications, for example as studs and noggings to support wall/ceiling boards or for providing protection and support for ducting, suspended ceilings, pipes, electrical wires.

With respect to FIGS. 7 to 11 of the drawings, the post of the present invention can be formed by roll forming apparatus. The roll forming apparatus is not shown in full in the drawings but supports and rollers are shown in broken outline.

In FIGS. 7 to 11, a metal plate 16 is progressively formed into the post previously described.

Figure 7:
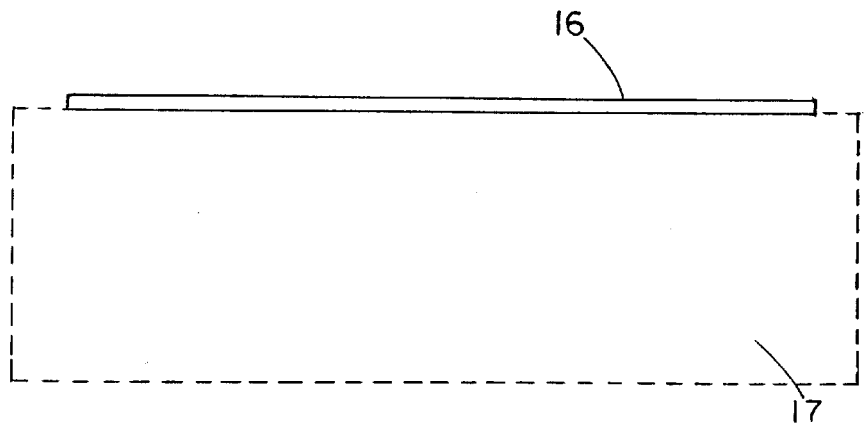
FIGS. 7,8,9,10, and 11 illustrate a method by which the post of FIG. 2 can be formed from a flat metal plate.
Figure 8:
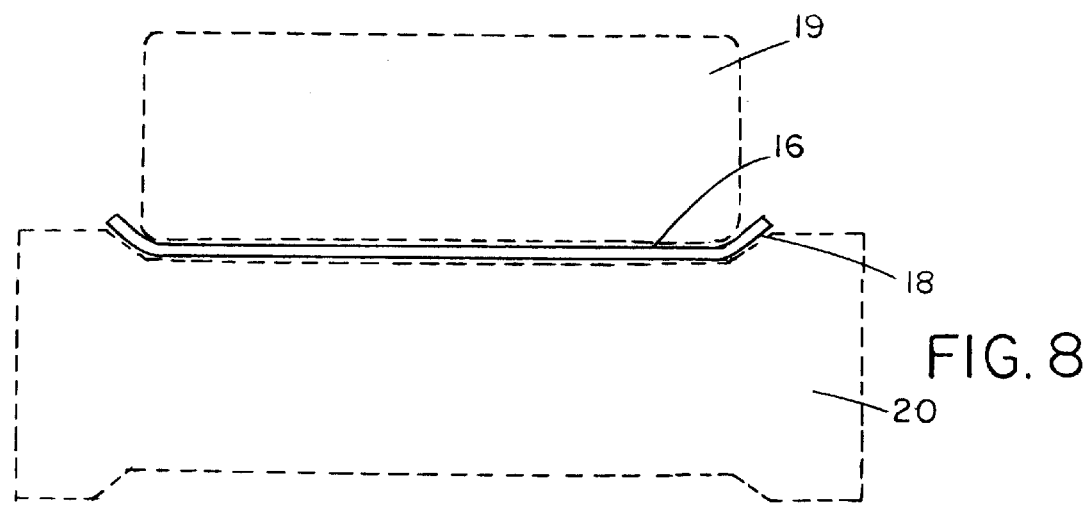
Figure 9:
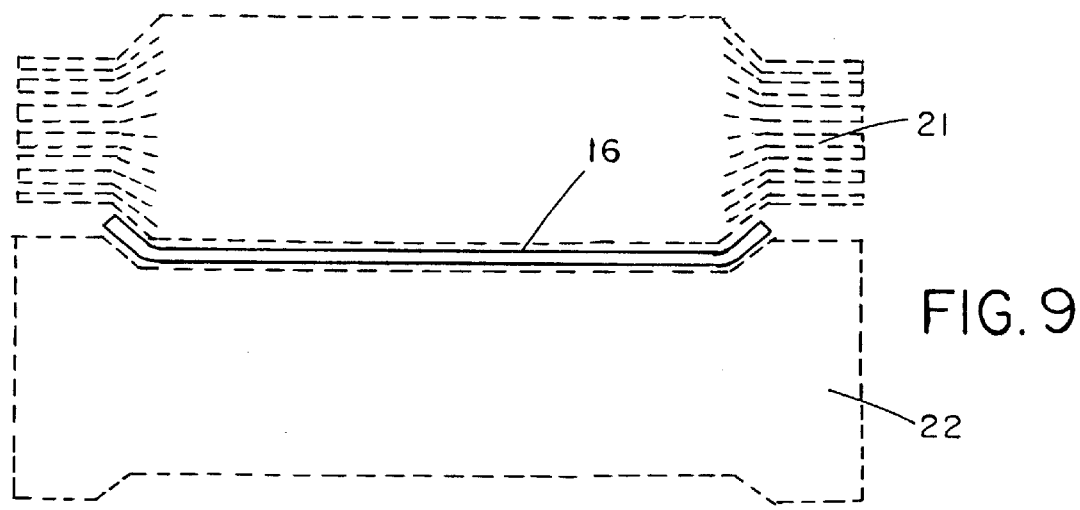
Figure 10:
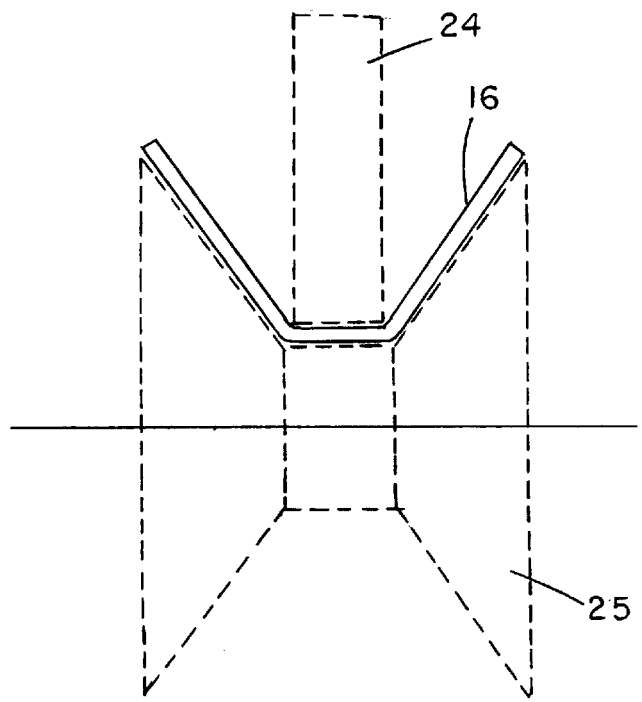
Figure 11:
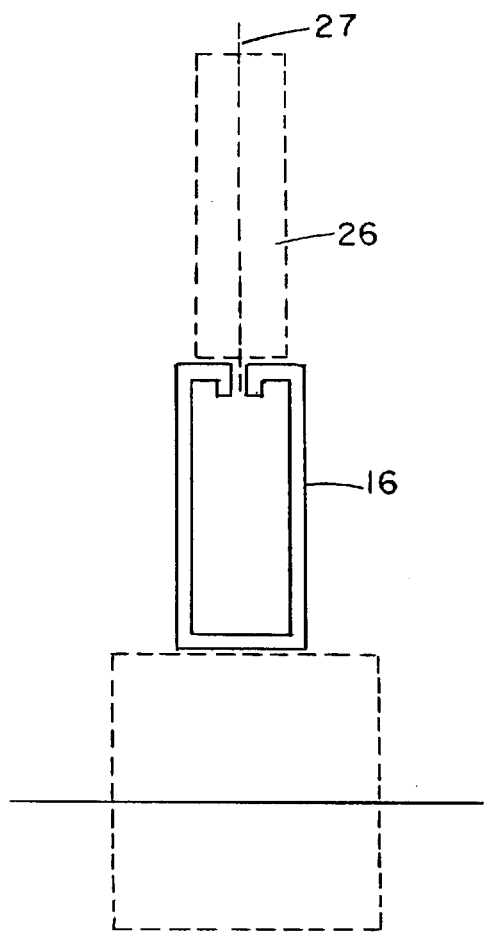

In FIG. 7 the metal plate 16 is presented to supporting roller 17.

Beyond roller 17, the edges 18 of the plate 16 are bent as the plate passes between complimentary rollers 19,20.

Beyond rollers 19,20, the plate 16 passes between complimentary rollers 21,22 which have toothed ends 23 and the edges 18 are serrated.

Beyond rollers 21,22 (FIG. 10) the metal plate is formed into the box-shape indicated by rollers 24,25, intermediate rollers (not shown) and at the finishing point roller 26 which has a thin central fin 27 centralises the metal section.

Figure 12:
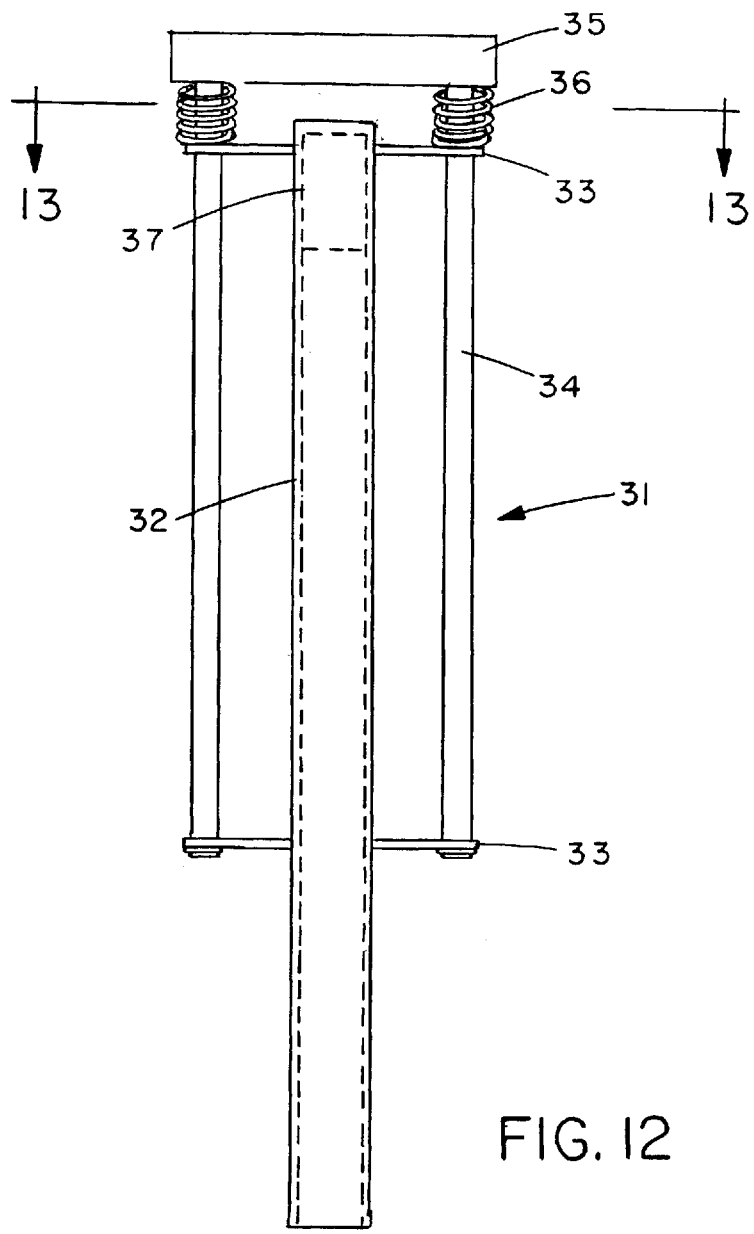
FIG. 12 is a side view of a fencing accessory in accordance with a further aspect of the present invention.
Figure 13:
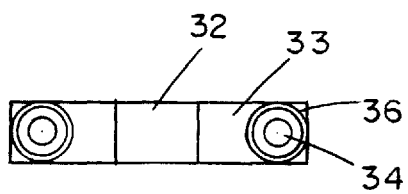
FIG. 13 is a cross-sectional view of the accessory of FIG. 12.

FIGS. 12 and 13 of the drawings illustrate a hand post driver indicated by arrow 31 which is designed to cushion shock during use. A standard driver comprises a post tube 32, cross-bars 33 and handles 34, these elements forming a rigid frame. The present invention modifies this arrangement by mounting a cap 35 to the handles 34 and interposing coil springs 36 between the upper cross-bar 33 and the cap 35. A solid plug 37 is fixed in the end of post tube 32. There is no connection between the end of the tube 32 adjacent the cap 35 and the handles 34 are free to slide in top cross-bar 33. When the tube 32 is impacted on a post the post exerts pressure on the plug 37 and simultaneously the springs are extended cushioning the blow and then almost instantaneously the end of the tube 32 is impacted by the cap 35 providing supplementary downward force.

Aspects of the present invention have been described by way of example only and it should be appreciated that modifications and additions may be made thereto without departing from the scope thereof as defined in the appended claims.

The claims defining the invention are:

1. A fence comprising:
   a plurality of elongate posts of substantially rectilinear cross-section, each post having on at least one, substantially flat, face an open channel having two parallel channel sides defined by adjacent inwardly turned edges to which attachments can be made and having opposed serrated faces, each channel side terminating at an inner end, said opposed serrated faces cooperating to provide a series of aligned apertures with respect to which attachments can be secured;
   a series of spaced fence wires supported by the posts;
   a plurality of staples securing the fence wires to the posts, each staple being driven into a pair of adjacent apertures of its respective post to secure the fence wires to the posts;
   each staple having a first prong and a second prong, each prong being joined to the other prong by a common limb, said first staple prong of a respective staple engaging with a respective one of said pair of adjacent apertures of said at least one face and said second staple prong engaging with the other aperture of said adjacent pair of apertures;
   each channel side having a locating end face at said inner end of said channel side, the locating end faces being co-planar with each other and perpendicular to said channel sides; and
   each staple having a shoulder, the locating end faces of said channel sides being co-planar and in face to face engagement with the shoulder of each inserted staple prong.

2. The fence as claimed in claim 1, wherein serrations extend over an entire length of each opposed face.

3. The fence as claimed in claim 2, wherein said serrations are of generally saw-tooth configuration with each serration having a sharp, pointed tip coincident with the tip of a serration in the opposed face.

4. The fence as claimed in claim 1, wherein each staple prong is generally flat and extends parallel to the other staple prong and perpendicular to the common limb, each prong being generally arrow-shaped and having an outer end comprising a single, sharp point, each prong having tapering side edges projecting from said outer end to said shoulder, the tapering side edges having a maximum width at said shoulder greater than the width of said aperture, and a reduced width tail portion extending from said shoulder to said common limb, said reduced width tail portion having parallel side edges which abut with the respective parallel channel sides.

5. A fence, comprising:

a plurality of elongate posts of substantially rectilinear cross-section, each post having a rear wall, a pair of side walls projecting from the rear wall and having front ends up to a front end face of the post, and a front wall extending from the front ends of the side walls and having a central opening, the front wall having opposite side portions extending from the respective side walls across part of the front end face up to said central opening, each side portion having an inturned flange of predetermined width extending inwardly perpendicular to the front end face and spaced from the inturned flange of the other side portion, the inturned flanges being parallel to one another and having opposing serrated faces, said serrated faces having serrations extending over the entire length of each of said flanges, said serrations being of saw-tooth configuration with each serration having a sharp-pointed tip coincident with an opposing tip of a serration in the opposing flange to provide a series of aligned, spaced apertures along the length of the front end face of the post;

a series of spaced fence wires supported by the posts;

a plurality of staples securing the fence wires to the posts, each staple being driven into a pair of adjacent apertures of its respective post to secure the fence wires to the posts;

each staple having a first prong and a second prong, each prong being joined to the other prong by a common limb, said first staple prong of a respective staple engaging with a respective one of said pair of adjacent apertures and said second staple prong engaging with the other aperture of said pair of apertures;

each inturned flange having an inner end comprising a locating end face oriented co-planar with the locating end face of the other inturned flange and parallel to the front end face of the post; and each staple having a shoulder, the locating end faces of said inturned flanges being co-planar and in face-to-face engagement with the shoulder of each inserted staple prong.

* * * * *